(12) United States Patent
Kim

(10) Patent No.: US 10,291,092 B2
(45) Date of Patent: May 14, 2019

(54) ROTOR AND MOTOR INCLUDING THE SAME

(71) Applicant: LG Innotek Co., Ltd., Seoul (KR)

(72) Inventor: Yong Chul Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 413 days.

(21) Appl. No.: 15/163,311

(22) Filed: May 24, 2016

(65) Prior Publication Data

US 2016/0352167 A1  Dec. 1, 2016

(30) Foreign Application Priority Data

May 27, 2015  (KR) .................. 10-2015-0073825

(51) Int. Cl.
*H02K 21/12* (2006.01)
*H02K 1/30* (2006.01)
*H02K 1/27* (2006.01)
*H02K 21/14* (2006.01)

(52) U.S. Cl.
CPC .............. *H02K 1/30* (2013.01); *H02K 1/276* (2013.01); *H02K 1/2706* (2013.01); *H02K 21/14* (2013.01)

(58) Field of Classification Search
CPC ........ H02K 1/276; H02K 1/30; H02K 1/2706; H02K 21/14
USPC .......................... 310/156.53, 156.56, 156.57
See application file for complete search history.

(56) References Cited

U.S. PATENT DOCUMENTS

| 8,896,175 | B2 * | 11/2014 | Cirani | H02K 1/2766 |
| | | | | 310/156.08 |
| 9,973,048 | B2 * | 5/2018 | Kawamoto | H02K 1/2773 |
| 2013/0026872 | A1 | 1/2013 | Cirani et al. | |
| 2013/0241340 | A1 * | 9/2013 | Koga | H02K 1/2773 |
| | | | | 310/156.56 |
| 2015/0171682 | A1 * | 6/2015 | Fujisawa | H02K 1/2766 |
| | | | | 310/156.53 |
| 2016/0268856 | A1 * | 9/2016 | Oketani | H02K 1/276 |

FOREIGN PATENT DOCUMENTS

| AT | 513451 B1 | 7/2014 |
| DE | 102009026287 A1 | 2/2011 |
| JP | 2014-003795 A | 1/2014 |
| KR | 10-1995-0067080 A | 6/1999 |

(Continued)

OTHER PUBLICATIONS

Extended European Search Report dated Oct. 11, 2016 in European Application No. 16164858.9.

(Continued)

*Primary Examiner* — Thanh Lam

(74) *Attorney, Agent, or Firm* — Saliwanchik, Lloyd & Eisenschenk

(57) ABSTRACT

The present invention relates to a motor for a vehicle and a rotor applied thereto, wherein the rotor includes a first rotor core having a plurality of magnet contact surfaces in a first direction that is a longitudinal direction, second rotor cores positioned to face the plurality of magnet contact surfaces, a plurality of magnets positioned between the first rotor core and the second rotor cores, and a partition unit disposed between the magnets adjacent to each other and configured to fix the second rotor cores and the magnets.

11 Claims, 6 Drawing Sheets

(56) References Cited

FOREIGN PATENT DOCUMENTS

| KR | 10-0200228 B1 | 6/1999 |
| KR | 10-2014-0016491 A | 2/2014 |
| WO | WO-2013099195 A1 | 7/2013 |

OTHER PUBLICATIONS

European Office Action dated Nov. 11, 2017 in European Application No. 16164858.9.

* cited by examiner

ROTOR AND MOTOR INCLUDING THE SAME

CROSS-REFERENCE TO RELATED APPLICATION

This application claims the benefit under 35 U.S.C. § 119 of Korean Patent Application No. 10-2015-0073825, filed May 27, 2015, which is hereby incorporated by reference in its entirety.

BACKGROUND

1. Field of the Invention

The present invention relates to a rotor using a partition structure and a motor including the same.

2. Discussion of Related Art

As a motor for a vehicle has been developed to a high specification such as high torque and high speed, a robust design is necessarily required for a rotor structure applied to the motor.

Generally, the rotor structure applied to an interior permanent magnet (IPM) motor has a structure in which a magnet is inserted into a multilayer rotor core formed by stacking a plurality of rotor core members with a disk-shape on top of each other.

In this case, the magnet inserted into the rotor core is pressed into an insertion hole, provided in the rotor core formed in a multiplayer structure of the plurality of rotor core members made by pressing electrical steel sheets, to be fixed using a material like an adhesive etc.

However, the method of fixing only using the adhesive causes problems in which, when the motor is used for a long period or is used for long hours at a high temperature, adhesion of the adhesive fixing the magnet is degraded so that the magnet moves from an initially mounted position, a foreign material due to delamination of the adhesive is generated, or the magnet cannot be fixed due to glass transition at the high temperature.

Further, magnetic flux leakage between the magnet and the rotor core adjacent to each other becomes serious to cause a problem of reducing the output of the motor.

BRIEF SUMMARY

The present invention is directed to a rotor capable of ensuring a fixing reliability and solving a problem of magnetic flux leakage by fixing a rotor core separated into an inner portion and an outer portion and a magnet seated between the inner and outer portions of the rotor core using a partition structure made of a non-magnetic material, and a motor including the same.

According to an aspect of the present invention, there is provided a rotor including a first rotor core having a plurality of magnet contact surfaces in a first direction which is a longitudinal direction, second rotor cores positioned to face the plurality of magnet contact surfaces, a plurality of magnets positioned between the first rotor core and the second rotor cores, and a partition unit disposed between the magnets adjacent to each other and configured to fix the second rotor cores and the magnets.

Also, the rotor according to the embodiment of the present invention may be applied to a motor by including a motor housing, a stator disposed in the motor housing, a rotor disposed in the stator, and a shaft passing through a center of the rotor.

According to the embodiment of the present invention, a rotor core is separated into an inner portion and an outer portion, then a magnet is seated between the inner and outer portions of the rotor core, and the rotor core and the magnet are fixed using a partition structure made of a non-magnetic material, thereby ensuring a fixing reliability and preventing the output of a motor from being reduced by remarkably reducing magnetic flux leakage.

Further, the rotor core is formed by a method of a sintering process rather than a structure of compressing a multilayer structure forming the rotor core, and alignment is performed through the pressing process, thereby solving a delay problem of the compressing process and reducing material costs.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
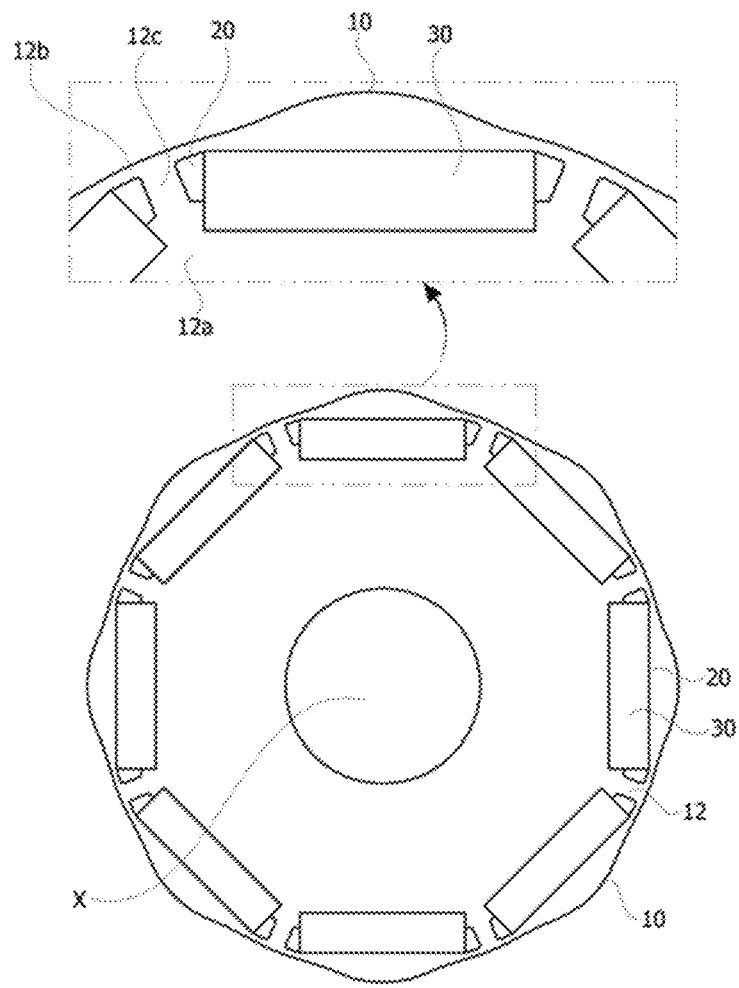
FIG. 1 is a conceptual view for describing a structure of a rotor and a concept of magnetic flux leakage.

Hereinafter, configurations and operations according to the present invention will be described in detail with reference to the accompanying drawings. In the description with reference to the accompanying drawings, like elements are designated by the same reference numerals regardless of drawing numbers, and duplicated descriptions thereof will be omitted. Although the terms "first," "second," etc. may be used herein to describe various elements, these elements should not be limited by these terms. These terms are only used to distinguish one element from another.

FIG. 1 is a conceptual view for describing a structure of a rotor and a concept of magnetic flux leakage.

Referring to FIG. 1, a rotor core 10 applied to a motor has a structure in which a plurality of multilayer structures are stacked on top of each other and has insertion holes 20 into which magnets 30 such as permanent magnets are inserted.

In this case, a method in which adhesion is enhanced by using an adhesive between the insertion hole and the magnet is used to prevent the magnet 30 from being detached. In this case, an outer portion 12b of the rotor core and an inner portion 12a of the rotor core have, as shown in FIG. 1, a structure of a bridge 12c with a small width. The structure of the bridge 12c enhances integrity of the rotor core in a structure in which magnet insertion holes 20 formed in the rotor core are formed, but causes magnetic flux leakage at a boundary part between the magnets. A method in which the boundary part is formed to be thin is used to prevent magnetic flux leakage, but cannot prevent the magnetic flux leakage from being increased.

Figure 2:
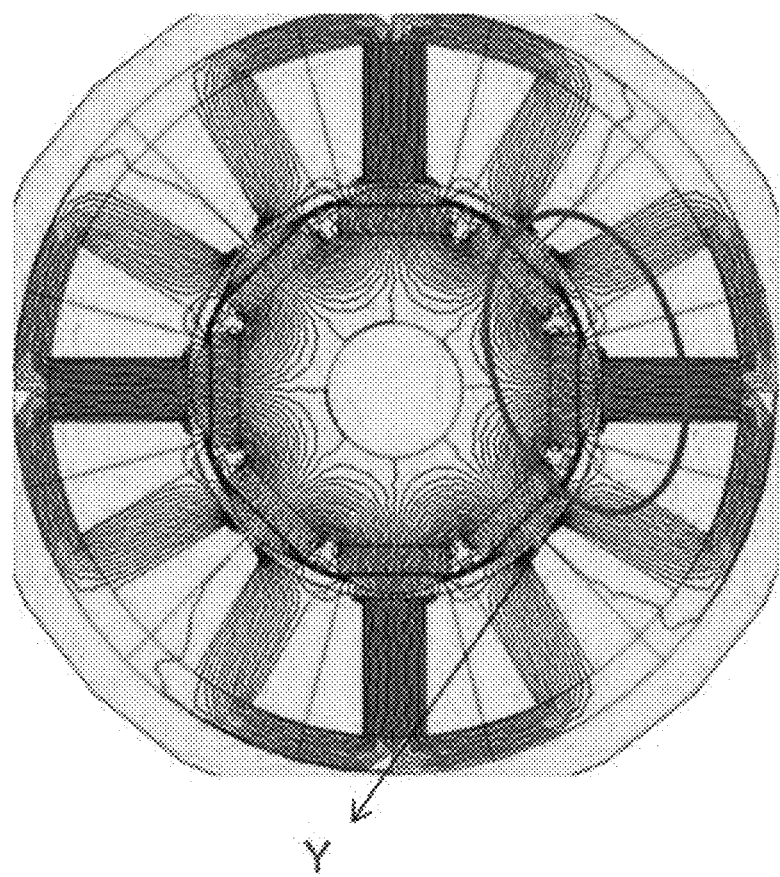
FIGS. 2 and 3 illustrate a flow of magnetic flux of a magnet in the structure of a rotor core in FIG. 1.
Figure 3:
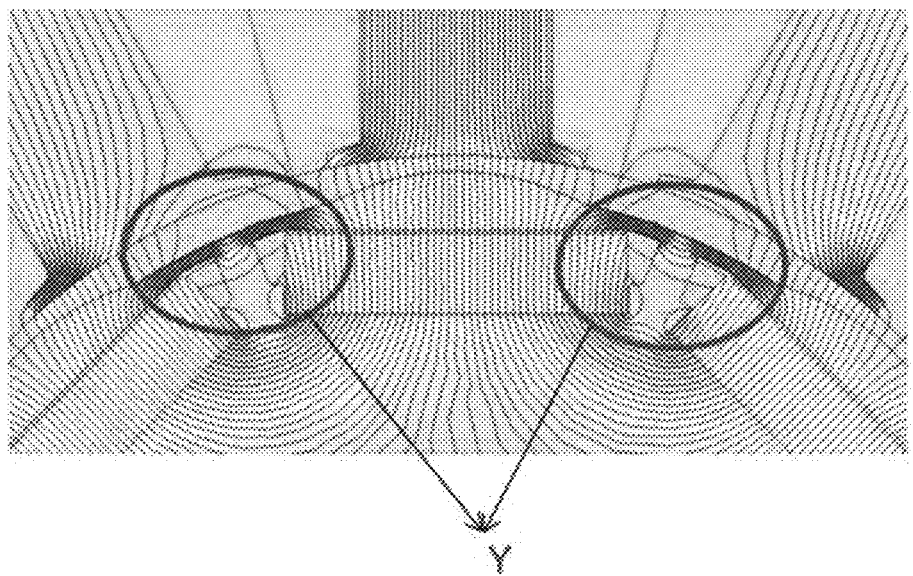

FIGS. 2 and 3 illustrate a flow of magnetic flux of a magnet in the structure of a rotor core in FIG. 1. Particularly, it is clearly confirmed that magnetic flux leakage is caused in a uniform flow of magnetic flux in a bridge area Y of FIGS. 2 and 3.

Figure 4:
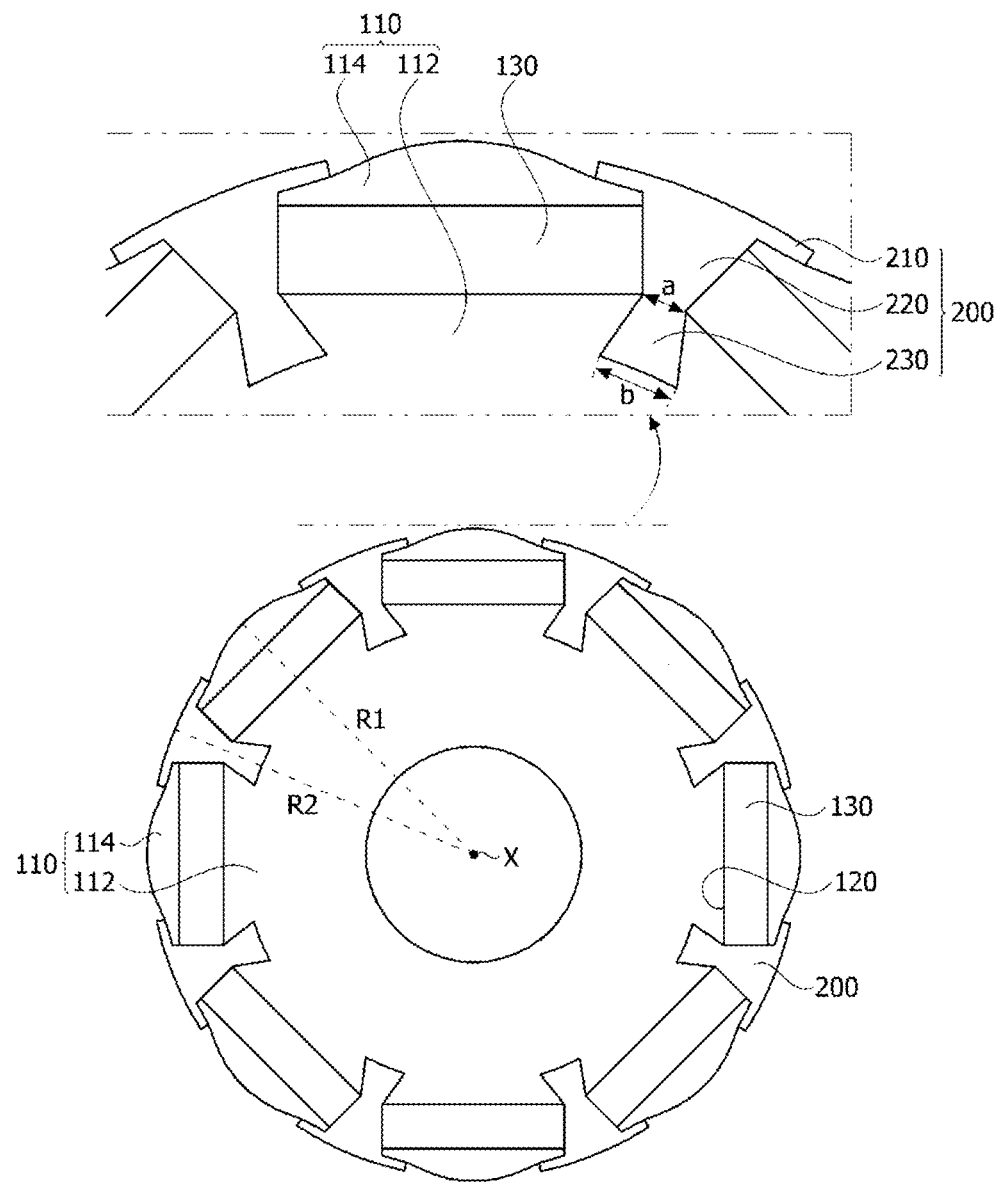
FIG. 4 is a conceptual view illustrating a structure of a rotor according to one embodiment of the present invention.

FIG. 4 is a conceptual view illustrating a structure of a rotor according to one embodiment of the present invention to solve the problem of magnetic flux leakage. Referring to FIG. 4, the rotor according to the embodiment of the present invention includes a first rotor core 112 having a plurality of magnet contact surfaces 120 in a first direction that is a longitudinal direction, a plurality of second rotor cores 114 positioned to face the plurality of magnet contact surfaces 120, a plurality of magnets 130 positioned between the first rotor core 112 and the second rotor cores 114, and a partition unit 200 disposed between the magnets 130 adjacent to each other and fixing the second rotor cores 114 and the magnets 130. That is, the rotor according to the embodiment of the present invention has a structure in which the first rotor core 112 and the second rotor cores 114 are separated and may have a structure in which the magnets 130 are disposed between the first rotor core 112 and the second rotor cores 114 and the first rotor core 112, the second rotor cores 114, and the magnets 130 are fixed using the partition unit 200.

The partition unit 200 may be formed of a non-magnetic material to prevent magnetic flux leakage caused in a space between the magnets. Further, the magnets inserted into the insertion holes in a conventional press-in method, as shown in FIG. 4, adhere to a space between the first rotor core 112 and the second rotor cores 114, then the partition unit 200 is fixed in an insertion and coupling method from an upper portion to a lower portion like the structure of FIG. 4, and thus the partition unit 200 may stably fix the magnets as a whole.

The partition unit 200 may include a fastening unit 230 allowing one end part of the partition unit to be fastened to the first rotor core 112, a supporting unit 220 extending from the fastening unit 230 and supporting one sides of the magnets adjacent to each other, and a head unit 210 connected with the supporting unit 220 and adhering to outer circumferential surfaces of the second rotor cores 114.

The fastening unit 230 is coupled to the first rotor core 112. In the embodiment, the fastening unit 230, as shown in FIG. 4, may be inserted into and coupled to a coupling groove formed at an outer circumferential surface of the first rotor core 112 and may have a cross-sectional shape having a second width (b) wider than a first width (a) with respect to the first width (a) of a boundary surface between the supporting unit 220 and the fastening unit 230 as shown to prevent the partition unit 200 from being detached. Also, the fastening unit 230 may have a structure in which a width becomes wider toward a center part of the first rotor core. As the example, as shown in FIG. 4, the cross-sectional shape of the fastening unit 230 may have a trapezoid structure or a three-dimensional structure having a polygonal, circular, or elliptical cross-section.

The supporting unit 220 may have a structure in which a width, as shown in FIG. 4, becomes wider outward to support side surfaces of the magnets 130 on opposite sides to be adjacent to each other. The head unit 210 is provided at the end of the supporting unit 220 to strongly press and fix the outer surfaces of the second rotor cores 114.

Particularly, the head unit 210 may have a structure of covering one area of the outer circumferential surfaces of the second rotor cores adjacent to each other. Therefore, one end of the partition unit 200 is inserted to the outer surface of the first rotor core 112 to be fastened, and at the same time, the other end of the partition unit 200 may press the outer surfaces of the second rotor cores 114 to be attached to fix the second rotor cores 114 to the first rotor core 112 as a whole. Further, a space in which the magnets 130 are fixed may be formed with the first rotor core 112, the second rotor cores 114, and the partition unit 200.

In the embodiments of the present invention, with respect to a center X of the first rotor core 112, a radius of curvature R2 formed with an outer circumferential surface of the head unit is equal to or less than a radius of curvature R1 formed with an outer circumferential surface of the second core rotor from the center of the first rotor core, thereby reducing resistance of the rotating force in the entire rotor structure and reducing magnetic flux leakage at the same time.

Particularly, the first rotor core 112 and the second rotor cores 114 in the embodiment of the present invention, as shown in FIG. 1, may have a predetermined length each as an integral structure by sintering a magnetic material rather than a multilayer structure of electrical steel sheets. Therefore, a manufacturing process becomes simple compared to a conventional structure in which a plurality of disk-shaped rotor core members formed by cutting the electrical steel sheets are aligned and pressed to form a multilayer structure, and a required structure is formed by a method of sintering the magnetic material, such that there is no loss of material, thereby remarkably reducing process costs.

In the embodiment of the process of manufacturing the rotor core as shown in FIG. 4, the first rotor core 112 is formed in a process of sintering a magnetic material. In this case, a center part of the first rotor core 112 is opened so that a rotating shaft, such as a shaft, passes therethrough. The coupling groove into which the above-described partition unit 200 is inserted to be coupled is formed at the outer circumferential surface of the first rotor core 112. After that, the magnets are disposed on the magnet contact surfaces 120 formed on the first rotor core 112. In this case, an attachment method using an adhesive may be used for stable arrangement, but, depending on a circumstance, the magnets are partially and temporarily attached to the magnet contact surfaces 120, then the outer circumferential surfaces of the magnets are covered with the second rotor cores 114, and the partition unit 200 is inserted from the upper portions of the first rotor core 112 and the second rotor cores 114 to the lower portions thereof to be coupled. A member used for the temporary attachment, such as a tape, may be removed after the insertion is partially performed, and an assembling process may be completed without the adhesive. Of course, when the adhesive is used, the magnets are more stably arranged and fixed.

Particularly, after the first rotor core 112 and the second rotor cores 114 are separated, the partition unit 200 made of a non-magnetic material is formed to solve a problem of magnetic flux leakage between the magnets.

Figure 5:
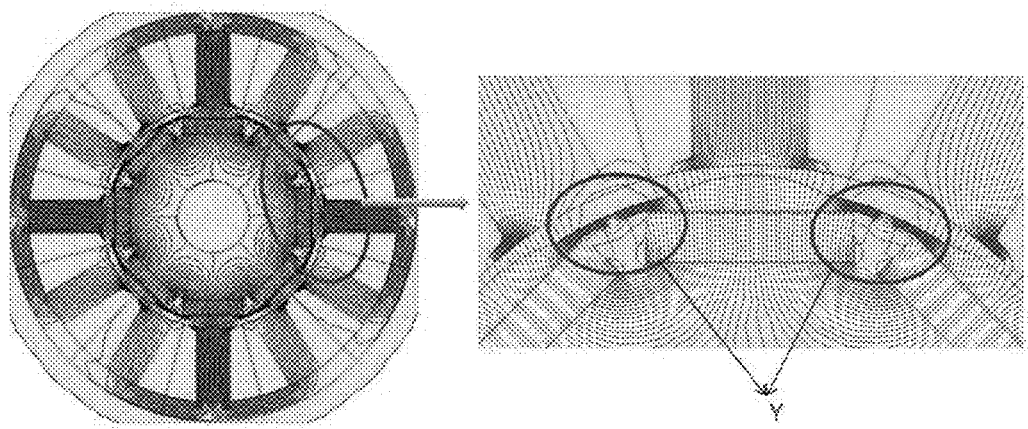
FIG. 5 is an image illustrating a leaked magnetic flux density of the rotor having a partition unit according to one embodiment of the present invention formed in the structure of FIG. 4.

FIG. 5 is an image illustrating a leaked magnetic flux density of the rotor according to one embodiment of the present invention having a partition unit and formed in the structure of FIG. 4.

As compared to FIGS. 2 and 3, in the structure of the embodiment in FIG. 5, it is confirmed that magnetic flux is very uniform in an area Z of the partition unit, which shows that magnetic flux leakage is remarkably reduced compared to the magnetic flux leakage in the bridge area Y in FIG. 3.

Figure 6:
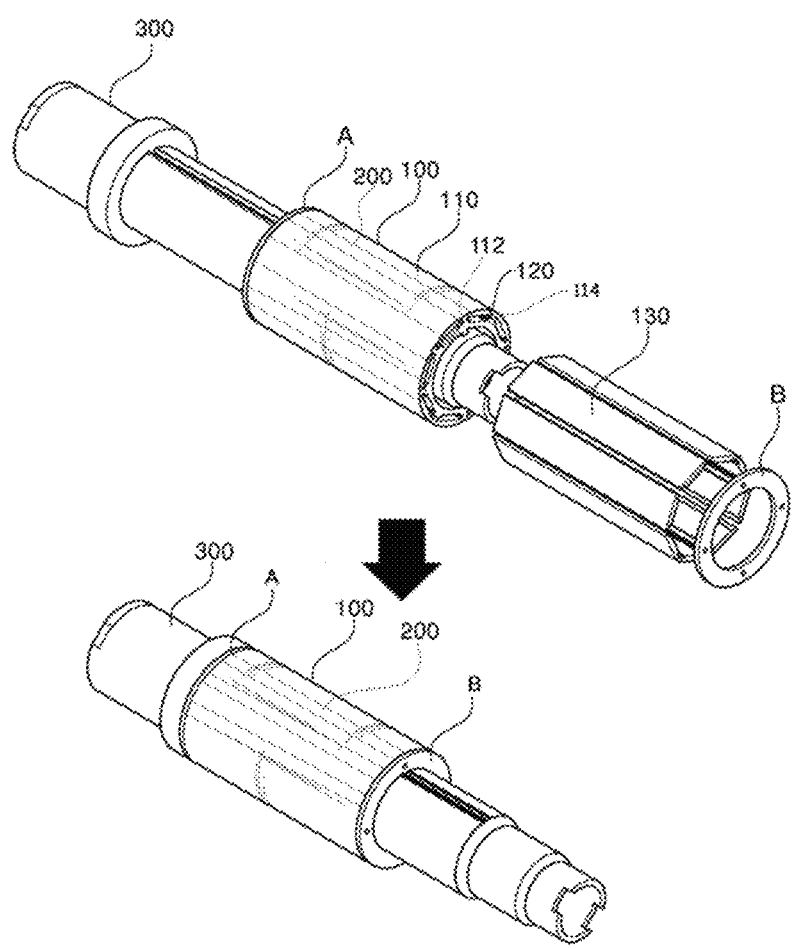
FIG. 6 is an image illustrating an implementation example of coupling of a shaft of the motor to which the structure (FIG. 4) of the rotor according to one embodiment of the present invention is applied.

FIG. 6 is an image illustrating an implementation example of coupling of a shaft of the motor to which the structure (FIG. 4) of the rotor according to one embodiment of the present invention is applied.

In the structure of FIG. 6, a component corresponding to a reference numeral '100' is a rotor, and the configuration of the rotor is applied the same as the structure of the embodiment of the present invention described above in FIG. 4.

Referring to FIGS. 4 and 6, a shaft 300 passing through a center of the rotor 100 according to the embodiment of the present invention is coupled to the rotor 100, and fixing plates A and B are disposed on upper and lower surfaces of the above-described rotor 100. That is, the rotor 100 is manufactured so that the first rotor core 112 and the second rotor cores 114 are separated, the magnet 130 is disposed between the first rotor core 112 and the second rotor cores 114, and the three components may be coupled and fixed using the partition unit 200. The rotor may be disposed in the housing of the motor and may be coupled to the stator to be implemented as various motors.

Figure 7:
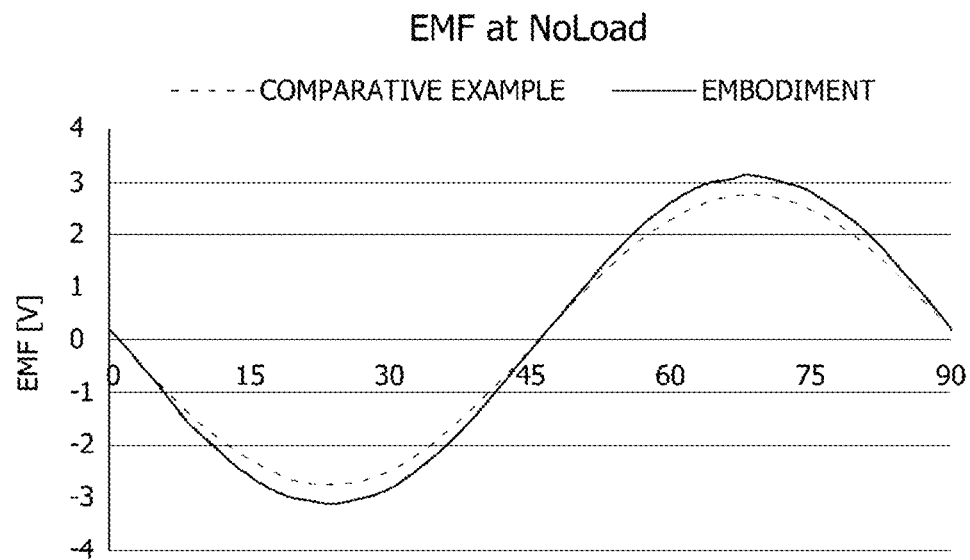
FIGS. 7 and 8 are graphs of results of performance examination of the motors to which the comparative structure (FIG. 1) and the embodiment structure (FIG. 4) are applied.
Figure 8:
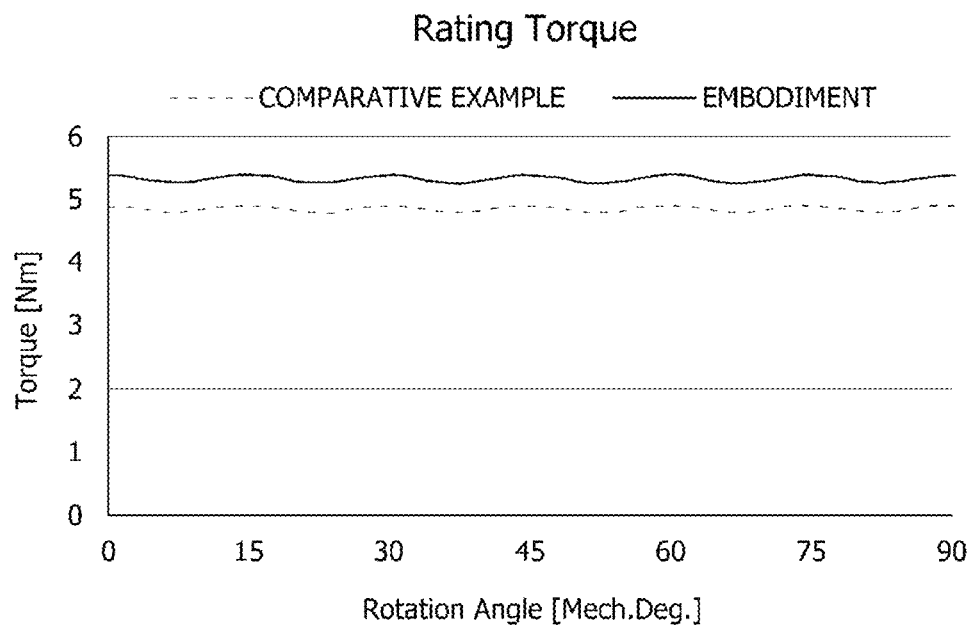

FIGS. 7 and 8 are graphs of results of performance examination of the motors to which the comparative structure (FIG. 1) and the embodiment structure (FIG. 4) are applied.

FIG. 7 is a measurement of no-load counter electromotive force (EMF) relating to the performance of motor. The maximum EMF is 2.75 V in the comparative example, but the maximum EMF is 3.12 V in the embodiment of the present invention, and thus it is confirmed that the EMF is increased by approximately 13%.

Further, the rating torque is 4.84 Nm in the comparative example, but the rating torque is 5.32 Nm in the embodiment, and thus it is confirmed that the rating torque is increased by approximately 9.8%. Therefore, it shows that the rating torque of the motor is increased by 9.8% and the size of the motor may be reduced by 9.8%.

The detailed description of the present invention as described above has been described with reference to certain preferred embodiments thereof. However, various modifications may be made in the embodiments without departing from the scope of the present invention. The inventive concept of the present invention is not limited to the embodiments described above, but should be defined by the scope of claims and equivalents thereof.

DESCRIPTION OF SYMBOLS

100: ROTOR
112: FIRST ROTOR CORE
114: SECOND ROTOR CORE
130: MAGNET
200: PARTITION UNIT
210: HEAD UNIT
220: SUPPORTING UNIT
230: FASTENING UNIT

What is claimed is:

1. A rotor comprising:
a first rotor core having a plurality of magnet contact surfaces in a first direction that is a longitudinal direction;
a plurality of second rotor cores positioned to face the magnet contact surfaces;
a plurality of magnets positioned between the first rotor core and the second rotor cores; and
a partition unit disposed between the magnets adjacent to each other and configured to fix the magnets and the second rotor cores, the partition unit including a head unit attached to outer circumferential surfaces of the second rotor cores.

2. The rotor of claim 1, the partition unit further including a fastening unit having one end fastened to the first rotor core and a supporting unit extending from the fastening unit and configured to support one sides of the magnets adjacent to each other.

3. The rotor of claim 2, wherein the fastening unit is inserted into a coupling groove provided on the first rotor core.

4. The rotor of claim 3, wherein the fastening unit has a cross-section having a second width wider than a first width with respect to the first width of a boundary surface between the fastening unit and the supporting unit.

5. The rotor of claim 4, wherein the fastening unit has a structure in which a width becomes wider toward a center part of the first rotor core.

6. The rotor of claim 2, wherein the partition unit is formed of a non-magnetic material.

7. The rotor of claim 2, wherein the head unit has a structure of covering one area of the outer circumferential surfaces of the second rotor cores adjacent to each other.

8. The rotor of claim 7, wherein a radius of curvature of an outer circumferential surface of the head unit with respect to a center of the first rotor core is equal to or less than a radius of curvature of an outer circumferential surface of a second rotor core with respect to a center of the first rotor core.

9. The rotor of claim 1, wherein the first rotor core and the second rotor core are a non-multilayer sintered structure.

10. A motor comprising:
a motor housing:
a stator disposed in the motor housing:
a rotor disposed in the stator: and
a shaft passing through a center of the rotor,
wherein the rotor includes a first rotor core having a plurality of magnet contact surfaces in a first direction that is a longitudinal direction, second rotor cores positioned to face the plurality of magnet contact surfaces; a plurality of magnets positioned between the first rotor core and the second rotor cores; and a partition unit disposed between the magnets adjacent to each other and configured to fix the second rotor cores and the magnets, the partition unit including a head unit attached to outer circumferential surfaces of the second rotor cores.

11. The motor of claim 10, wherein the motor includes a fastening unit allowing one end part of the partition unit to be fastened to the first rotor core, a supporting unit extending from the fastening unit and configured to support one sides of the magnets adjacent to each other; and the head unit being connected with the supporting unit.

* * * * *